United States Patent [19]
Tedford, Jr.

[11] 4,449,990
[45] May 22, 1984

[54] METHOD AND APPARATUS FOR FRACTIONING OXYGEN

[75] Inventor: Richard A. Tedford, Jr., Middletown, Conn.

[73] Assignee: Invacare Respiratory Corp., Elyria, Ohio

[21] Appl. No.: 416,578

[22] Filed: Sep. 10, 1982

[51] Int. Cl.³ .......................................... B01D 53/04
[52] U.S. Cl. .......................................... 55/26; 55/33; 55/58; 55/62; 55/68; 55/75; 55/179
[58] Field of Search ............... 55/18, 25, 26, 58, 62, 55/68, 75, 162, 179, 389

[56] References Cited

U.S. PATENT DOCUMENTS

| | | | |
|---|---|---|---|
| 2,944,627 | 7/1960 | Skarstrom | 55/58 |
| 3,138,439 | 6/1964 | Skarstrom | 55/33 |
| 3,142,546 | 7/1964 | Marsh et al. | 55/26 |
| 3,176,444 | 4/1965 | Kiyonaga | 55/26 |
| 3,225,518 | 12/1965 | Skarstrom | 55/33 |
| 3,237,377 | 3/1966 | Skarstrom | 55/25 |
| 3,242,650 | 3/1966 | Crawford | 55/163 |
| 3,252,268 | 5/1966 | Stark | 55/25 |
| 3,313,091 | 4/1967 | Berlin | 55/58 |
| 3,338,030 | 8/1967 | Feldbauer, Jr. | 55/25 |
| 3,533,221 | 10/1970 | Tamura | 55/33 |
| 3,710,547 | 1/1973 | Nelson | 55/58 |
| 3,719,025 | 3/1973 | Heinze et al. | 55/31 |
| 3,738,087 | 6/1973 | McCombs | 55/58 |
| 3,788,036 | 1/1974 | Lee et al. | 55/25 |
| 3,880,616 | 4/1975 | Myers et al. | 55/62 |
| 3,891,411 | 6/1975 | Meyer | 55/26 |
| 3,923,477 | 12/1975 | Armond | 55/25 |
| 3,957,463 | 5/1976 | Drissel et al. | 55/25 |
| 3,977,845 | 8/1976 | Walter | 55/25 |
| 4,013,429 | 3/1977 | Sircar et al. | 55/33 |
| 4,021,210 | 5/1977 | Streich et al. | 55/26 |
| 4,168,149 | 9/1979 | Armond et al. | 55/21 |
| 4,222,750 | 9/1980 | Gauthier et al. | 55/58 |
| 4,348,213 | 9/1982 | Armond | 55/25 |
| 4,349,357 | 9/1982 | Russell | 55/179 X |
| 4,378,982 | 4/1983 | McCombs | 55/179 X |

Primary Examiner—Robert H. Spitzer
Attorney, Agent, or Firm—Fay & Sharpe

[57] ABSTRACT

A pair of beds (10, 12) are connected by a cross-over valve (20) cyclically with a source of air under pressure (22) and a source of vacuum (24). The beds are further interconnected by a pressure equalization flow path (40) and a pressure equalization valve (42) for selectively opening and closing the flow path. The beds are filled with a physical separation material which allows oxygen to pass more readily than other components of air. The separated oxygen is collected in a surge tank (30). A timing and control circuit (50) controls the cross-over valve such that it reverses positions twice per cycle. The timing and control circuit further controls the pressure equalization valve to open 1 percent of the cycle duration before the cross-over valve reverses positions and to close 2 percent of the cycle duration after the cross-over valve changes positions.

18 Claims, 4 Drawing Figures

METHOD AND APPARATUS FOR FRACTIONING OXYGEN

BACKGROUND OF THE INVENTION

The present invention pertains to the art of molecular separation, specifically the physical separation of molecules in gaseous mixtures. The invention finds particular application in the separation of nitrogen from atmospheric air to provide a source of high concentration oxygen. In the preferred embodiment, the oxygen enriched gas is supplied at appropriate pressure, rate, purity, and the like for human respiration or other medical applications. The present invention is especially suited for providing oxygen to patients who require elevated concentrations of oxygen in their breathing air. It is to be appreciated, however, that the invention is also applicable to the separation of gaseous molecules of other types such as drying high purity gases, separating hydrogen from gaseous hydrocarbons or other hydrogen compounds, and the like.

A pioneer apparatus and method for fractioning gaseous mixtures by adsorption is illustrated in U.S. Pat. No. 2,944,627, issued July 12, 1960 to Charles W. Skarstrom. In the Skarstrom system, a cross-over valving assembly alternately channeled the gas to be fractionated to first and second vessels. The cross-over valve assembly further connected the vessel which was not receiving the gas with a waste gas discharge. The vessels were packed with a material, for example zeolite, which selectively adsorbed one or more components of the gas and passed an enriched product gas. The produce gas which passed through the vessel was channelled to a primary product outlet with a large fraction being channelled to the other vessel. The fraction flushed the adsorbed or waste gases which had been trapped by the other vessel. Cyclically, the cross-over valving assembly switched the connection of vessels with the incoming gas and the waste gas discharge. This cyclic switching of the vessels provided a regular flow of the primary product gas from the primary product outlet.

Numerous improvements have been made upon the Skarstrom system. One of these improvements is illustrated in U.S. Pat. No. 3,313,091 issued April, 1967 to Norton H. Berlin. The Berlin system utilized a vacuum pump to draw the adsorbed or waste gases from the vessel or bed which was being purged. Further, the Berlin system used a more complex valving system to produce a cycle which included vessel or bed pressure equalization (up), repressurization, product production, bed pressure equalization (down), dumping, and purging.

Among the patents which assert improvements upon the Skartstrom and Berlin cycles is U.S. Pat. No. 4,222,750 issued September, 1980 to William D. Gauthier et al. In the Gauthier system, the vessels or beds cyclically underwent 30 second periods of adsorption in which they received gas from a compressor and desorption in which they were connected with a vacuum pump. During at least a 20 percent but not more than 33 percent of the desorption cycle, i.e. 6 to 10 seconds, a portion of the primary product gas from the adsorbing bed was passed through the desorbing bed. This portion of the primary product gas flushed or purged the adsorbed gas products from the desorbing bed. With the disclosed timing cycle, Gauthier proported to achieve 95 percent oxygen purity at a flow rate of 2 liters per minute, dropping linearly to a 58 percent oxygen purity at 10 liters per minute.

One of the problems with the Gauthier cycle was that a portion of the primary product gas which was separated during adsorption was lost during purging. During purging, primary product gas was swept with the adsorbed gas through the vacuum pump and discharged to the atmosphere. This lowered the primary product gas production capacity and efficiency of the system.

The present invention contemplates a new and improved gas fractioning apparatus and method which provides improved primary product production capacity and efficiency.

SUMMARY OF THE INVENTION

In accordance with the present invention, there is provided a method of fractionating components of a gaseous mixture. Concurrently, the gaseous mixture is supplied under pressure to a bed of a physical separation medium which adsorbs at least one adsorbable component and passes at least one substantially nonadsorbable component of the mixture and a second bed is evacuated. Before reaching the capacity of the gaseous mixture supplied bed to adsorb the adsorbable component, the beds are brought toward pressure equilibrium by allowing the gas to flow between the beds. While gas is flowing between the beds, the supply of the gaseous mixture to and the evacuation of the beds are reversed. That is, the gaseous mixture is supplied to the heretofore evacuated bed and the heretofore gaseous mixture supplied bed is evacuated. Subsequent to reversing the supply of the gaseous mixture and the evacuation to beds, the pressure equalization flow is terminated. These steps are cyclically repeated to provide continuing production of the nonadsorbable component.

In accordance with another aspect of the present invention, there is provided an apparatus for physically separating molecules of oxygen from a gaseous mixture. The apparatus comprises first and second beds each containing a physical separation material. A cross-over valving means selectively connects an inlet of one of the first and second beds with a supply of the gaseous mixture under pressure and an inlet of the other bed with a vacuum source. A timing and control means causes the cross-over valving means to connect each of the first and second beds cyclically with the gaseous mixture supply and the vacuum source. The duration in which one of the bed goes through a cycle of being connected with the gaseous mixture supply and the vacuum pump being denoted as a cycle duration. A flow path which connects outlets of the first and second beds has a gas flow capacity which is sufficient to bring the first and second bed substantially into pressure equilibrium in less than 7 percent of the cycle duration. A pressure equalization valve which selectively permits and prevents gas flow through the flow path is connected with the timing and control means. The timing and control means causes the pressure equalization valve to open less than 4 percent of the cycle duration before each actuation of the cross-over valving means and to be closed less than 3 percent of the cycle duration after each actuation of the cross-over valving means. A surge tank is operatively connected with the first and second bed outlets by unidirectional valving means to collect oxygen molecules which have been separated by the first and second beds.

A primary advantage of the present invention is that it provides relatively high primary product production capacity. A relatively large amount of primary product is produced per unit volume is adsorbent.

Another advantage of the present invention is that it produces oxygen at a sufficiently high flow rate and purity for medical applications and for providing oxygen enriched breathing air for patients.

Another advantage of the present invention is that it is highly reliable.

Still further advantages of the present invention will become apparent upon reading and understanding the following detailed description of the preferred embodiment.

BRIEF DESCRIPTION OF THE DRAWINGS

The invention may take form in various steps and arrangements of steps and in various parts and arrangements of parts. The drawings are only for the purpose of illustrating a preferred embodiment of the invention and are not to be construed as limiting it.

DETAILED DESCRIPTION OF THE PREFERRED EMBODIMENT

Figure 1:
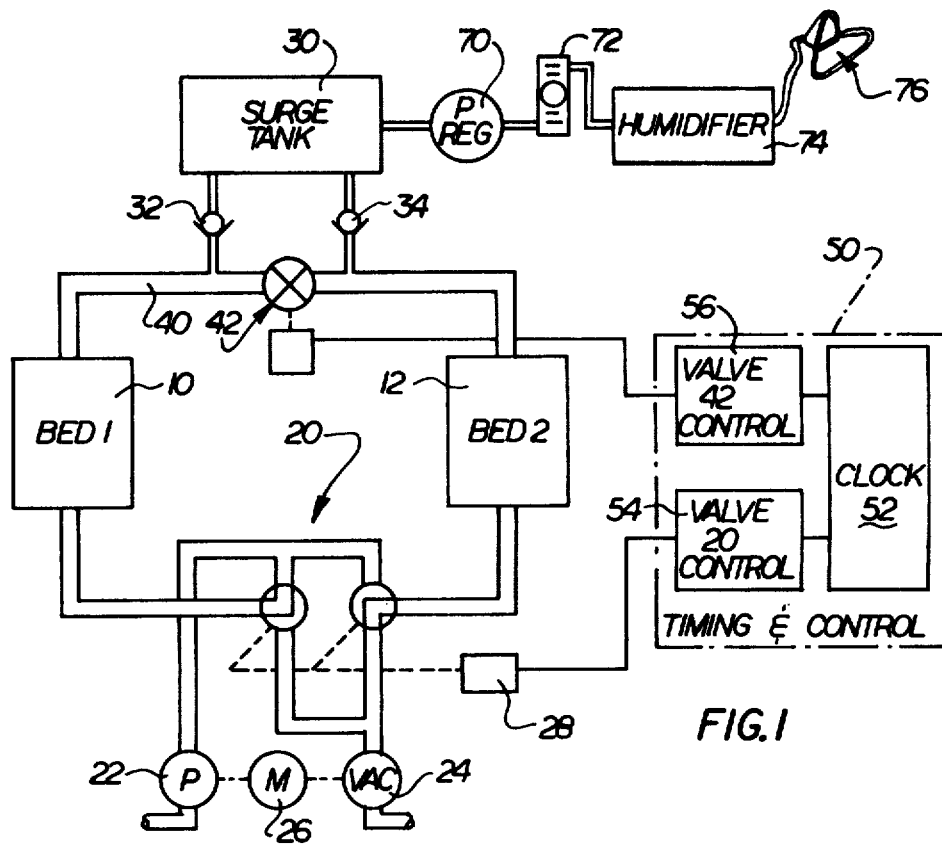
FIG. 1 is a block diagram of an apparatus in accordance with the present invention for separating a primary product gas from a gaseous mixture.

With reference to FIG. 1, the apparatus includes at least two beds 10 and 12 which are filled with a physical separation medium or material. The separation material selectively adsorbs one or more adsorbable components and passes one or more nonadsorbable components of such a gaseous mixture. The physical separation material is a molecular sieve with pores of uniform size and essentially the same molecular dimensions. These pores selectively adsorb molecules in accordance with molecular shape, polarity, degree of saturation, and the like. In the preferred embodiment, the physical separation medium is an aluminasilicate composition with 4 to 5 angstrom pores. More specifically, the molecular sieve is a sodium or calcium form of aluminasilicate, such as type 5A zeolite. Alternately, the aluminasilicate may have a higher silicon to aluminum ratio, larger pores, and an affinity for polar molecules, e.g. type 13x zeolite. The zeolites adsorb nitrogen, carbon monoxide, carbon dioxide, water vapor, and other significant components of air.

A cross-over valving means 20 selectively connects each one of the beds with a source of the gas mixture, e.g. air under pressure, and the other bed with a negative pressure or vacuum. Specific to the preferred embodiment, the cross-over valving means selectively connects one of the beds with an air pump or compressor 22 which supplies air under about 32 pounds per square inch and the other bed with a vacuum pump 24 which draws a vacuum of about 16 inches of mercury. The compressor and vacuum pump are connected to a common drive motor 26, in the preferred embodiment about a ¼ horse power electric motor. A solenoid 28 or other cross-over valve actuating means selectively causes the cross-over valving means to move alternately between first and second positions. In the first position, (illustrated in FIG. 1) the first bed 10 is connected with the compressor 22 and the second bed 12 is connected with the vacuum pump 24. In the second position, the first bed is connected with the vacuum pump and the second bed is connected with the air compressor.

As the gas mixture is introduced through a bed inlet to an adsorbed gas-free or regenerated bed, an adsorption zone of finite, relatively large size is formed. This adsorption zone is a region of the bed in which the full capacity of the adsorbent to hold the adsorbable components has not been reached. The composition of the gas in the voids of the zeolite varies from substantially pure primary product gas at the outlet end to the ambient gaseous mixture composition at the inlet end. This adsorption zone moves from the bed inlet toward a bed outlet with a velocity significantly less than the superficial gas velocity in the bed. When the adsorption zone reaches the outlet end of the bed, adsorbable components begin to flow through the bed outlet into the nonadsorbable primary product stream. This time is hereinafter referred to as the "breakthrough time". When breakthrough occurs, primary product enriched bed gas in the zeolite voids varies from a higher primary product gas concentration at the bed outlet to a lower concentration at the bed inlet. In the preferred embodiment the primary product enriched bed gas is about 80 percent primary product at breakthrough. While adsorption is occurring in one bed, the adsorbable components adsorbed by the separation medium of the other bed are removed under vacuum.

The first bed 10 is connected with a surge tank 30 by way of a first check valve 32 or other unidirectional valving means. The first check valve 32 permits the primary product gas from the first bed to flow into the surge tank when product gas pressure in the first bed exceeds the pressure of product gas in the surge tank. The first check valve prohibits the product gas from flowing from the surge tank when the pressure in the first bed is lower than the surge tank. More specific to the preferred embodiment, the check valve imposes a 1.5 psi bias such that flow is only permitted when the pressure in the first bed exceeds the pressure in the surge tank by 1.5 psi. The second bed is connected with the surge tank by way of a second check valve 34 or other unidirectional valving means. The second check valve again provides for unidirectional flow of the primary product gas from the second bed to the surge tank.

A pressure equalization flow path 40 extends between the outlets of the first and second beds. The flow path has a sufficient gas flow capacity such that when one bed is under full pressure and the other bed is under full vacuum, gas flow through the pressure equalization path substantially equalizes the bed pressures in less than 7 percent of the cycle duration. In the preferred embodiment, the flow path capacity is sufficient to bring the beds into pressure equilibrium in about 3 percent of the cycle duration or about 2 seconds. A pressure equalization valve 42 selectively permits and prevents a gas flow through the flow path between the first and second beds. A timing and control means 50 cyclically causes the cross-over valve actuating means 28 and the pressure equalization valve 42 to to be operated. The timing and control means includes a clocking means 52 which periodically and cyclically enables a cross-over valve control means 54 and a pressure equalization valve control means 56.

Figure 2:
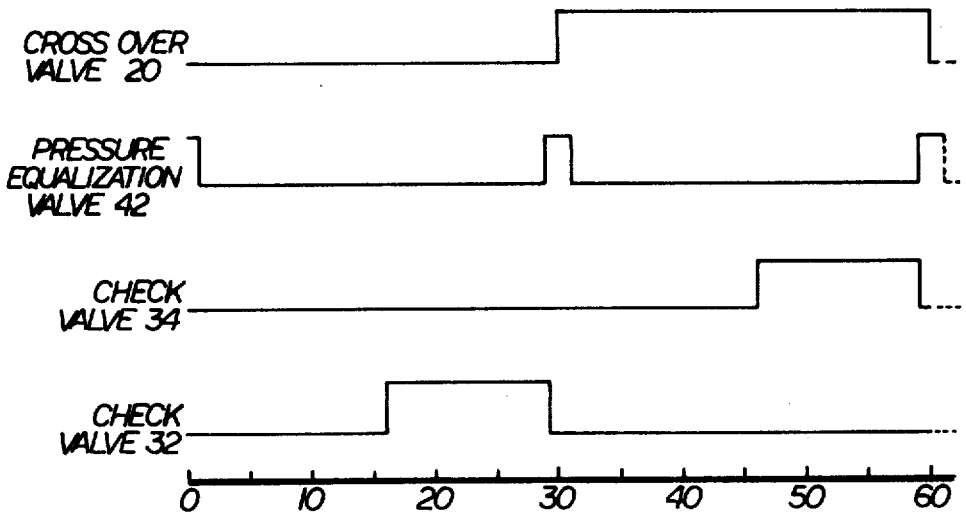
FIG. 2 illustrates valve position versus cycle time for valves of the apparatus of FIG. 1.

With reference to FIG. 2, the timing and control means causes the cross-over valving means 20 to alternate between its first and second positions after each one half cycle duration. The cycle duration is selected such that each bed is connected with the source of air for a duration which is equal to or less than the breakthrough time. In the preferred embodiment in which the beds are 4 inches in diameter, 15.5 inches in length, and each contain 5.5 pounds of 5A zeolite, the valving means directs the pressurized air to each bed continuously for 30 seconds per cycle, i.e. a cycle duration of 60 seconds. For simplicity of illustration, the cross-over valving means is illustrated in FIG. 2 as changing positions at zero, 30 seconds, 60 seconds, and so forth.

Figure 3:
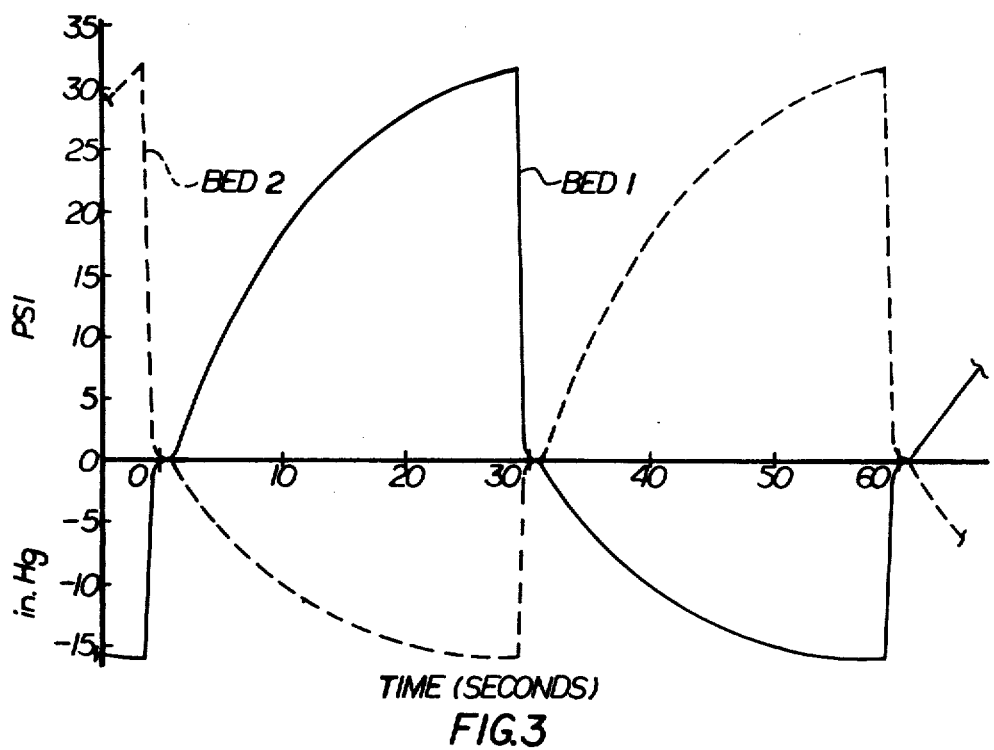
FIG. 3 illustrates bed pressure as a function of cycle time in the apparatus of FIG. 1 when used in accordance with the method of the present invention; and, FIG. 4 illustrates oxygen production capacity as a function of valve operation time for the apparatus of FIG. 1.

With reference to FIG. 3, from about 1 second to about 29 seconds under the time scale in which the cross-over valving means changes position at 0, 30, 60, etc. seconds, the gas mixture is supplied up to 32 pounds of pressure to the first bed. Concurrently, the second bed is evacuated with about 16 inches of mercury. Before the breakthrough time, the pressure equalization valve is opened allowing the primary product enriched gas held in the first bed to flow into the evacuated second bed. During the pressure equalization period which is indicated in FIG. 3, to start at 29 seconds, the pressure in the first bed and the vacuum in the second bed rapidly approach pressure equilibrium at about atmospheric pressure. Before the primary product enriched gas from the first bed is evacuated through the second bed, the cross-over valving means 20 is actuated to reverse its position, in FIG. 3 at 30 seconds. Actuating the cross-over valving means discontinues supplying of the gaseous mixture to the first bed and commences evacuating it and concurrently discontinues evacuating the second bed and commences supplying it with the gaseous mixture. Subsequent to the actuation of the cross-over valving means, the pressure equalization valve 42 remains open to continue bringing the beds into pressure equilibrium. At 31 seconds in FIG. 3, the pressure equalization valve closes terminating the flow of primary product gas between the beds. From about 31 seconds, the pressure in the second bed increases approaching the 32 psi gas mixture source pressure. Concurrently, the pressure in the first bed decreases approaching 16 inches of mercury. Before the secondary product molecules have traversed the second bed, at about 59 seconds, the pressure equalization valve 42 is opened allowing the primary product enriched gas in the zeolite voids of the second bed to flow to the first bed. This causes the first and second beds to approach substantial pressure equilibrium rapidly. While the primary product enriched gas is flowing to the first bed, at 60 seconds, the cross-over valving means is actuated. Actuating the cross-over valving means discontinues the evacuation of the first bed and commences supplying the gaseous mixture and concurrently discontinues supplying the gaseous mixture to the second bed and commences evacuating it. Subsequent to actuating the cross-over valving means, at 1 second (61 seconds), the pressure equalization valve is closed terminating the pressure equalizing flow of the primary product enriched gas between the beds. The steps are cyclically repeated to provide continuing fractionating of the primary product gas from the mixture.

Figure 4:
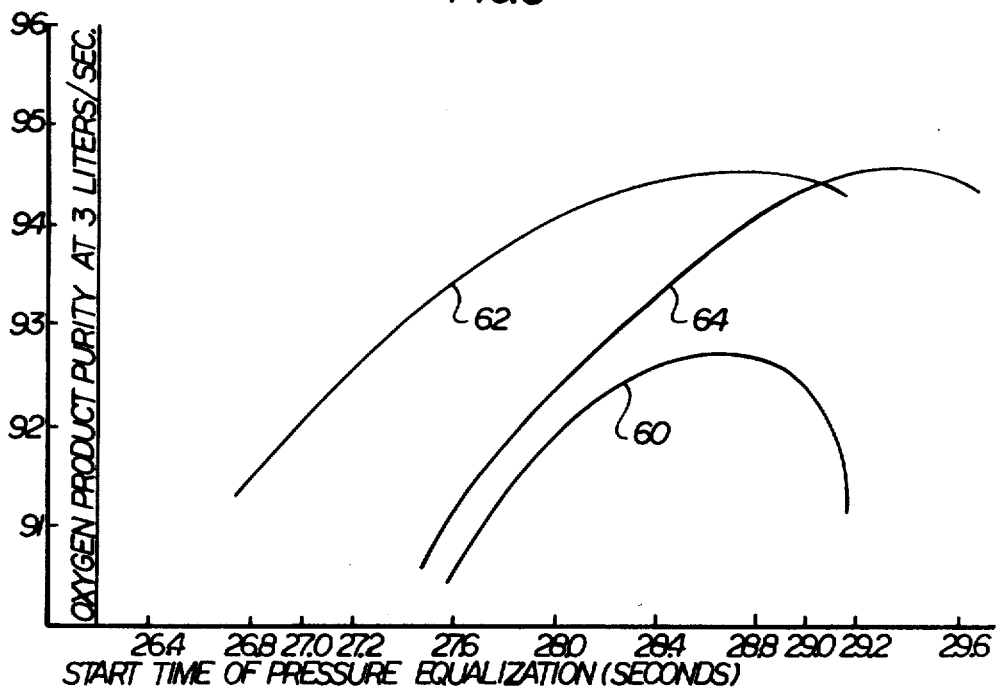

With reference to FIG. 4, the purity of oxygen obtained in the surge tank is plotted as a function of pressure equalization valve opening time for three pressure equalization valve closing times. Specifically, curve 60 shows the oxygen purity obtained for various pressure equalization valve opening times with a fixed pressure equalization valve closing time of 30.8 seconds into the 60 second cycle. Curve 62 shows the purity of oxygen obtained as a function of pressure equalization valve opening time for a fixed pressure equalization valve closing time of 31.0 seconds. Curve 64 shows an oxygen purity obtained as a function of pressure equalization valve opening time for a fixed closing time of 31.2 seconds. From this family of curves, it can be seen that relatively small variations in the time at which the pressure equalization valve is opened and closed cause significant variations in the purity of the primary product gas. Optimal oxygen purity is obtained when the pressure equalization valve is opened for a time period which spans the time at which the cross-over valve is actuated. In the preferred embodiment, the pressure equalization valve is opened at 29.4 and 59.4 seconds of each cycle, i.e. 0.6 seconds before the cross-over valve is opened and is closed at 1.2 and 31.2 seconds, i.e. 1.2 seconds after the cross-over valve is actuated. That is, in the preferred embodiment, the pressure equalization valve is open for three percent of the cycle, one percent of the cycle duration before the cross-over valve changes position and two percent after. It will be observed from the graph that excellent results can be obtained when the pressure equalization valve is open up to 3 seconds or 4 percent of the cycle duration before the cross-over valving means is actuated. From the continued increase in oxygen production capacity with later pressure equalization valve closing time, the family of curves can be extrapolated to predict satisfactory results for a pressure equalization valve closing 3 percent of the cycle duration or longer after cross-over valve actuation.

Referring again to FIG. 1, in the preferred embodiment, the surge tank 30 maintains a reservoir of oxygen at a minimum pressure of about 18 psi. The surge tank is connected with a pressure regulator 70 for controlling the pressure or flow rate of oxygen to the patient. A flow meter 72 provides a visual indication at the rate at which the patient is receiving oxygen. A humidifier 74 adds moisture to the oxygen primary product to replace the moisture removed by the beds. A breathing apparatus 76 assists in delivering the oxygen to the patient. Most medical prescriptions require that oxygen be supplied to the patient at the rate of 3 liters per minute or less. In the preferred embodiment, at a flow rate of 3 liters per minute, the oxygen is 94.6 percent pure. At 2 liter flow rate, the purity of the oxygen increases to 95.5 percent. Stated differently, the system has a capacity of 1.2 pounds of oxygen per day per pound of zeolite. Eleven pounds of zeolite, as in the preferred embodiment, produce 13 pounds of oxygen per day. With use, the zeolite commonly becomes contaminated with sorbants, such as water vapor, which are incompletely desorbed during evacuation. For example, it has been found that operation for 30 days with supersaturated air results in a 10 percent drop in oxygen production at 3 liters per minute.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the invention, the invention is now claimed to be:

1. A method of fractionating components of a gaseous mixture in which each cycle has a preselected cycle duration, the method comprising cyclically repeating the steps of:

supplying the gaseous mixture to one of first and second beds which each contain a physical separation medium which selectively adsorbs at least one adsorbable component and passes at least one substantially nonadsorbable component of the gaseous mixture, collecting the nonadsorbable component passed by the gaseous mixture supplied bed, and evacuating the other of the first and second beds;

before reaching the capacity of the gaseous mixture supplied bed to adsorb the adsorbable component and while continuing the steps of supplying the gaseous mixture to and evacuating the beds, allowing gas to flow between the beds at a rate which would bring the beds into pressure equilibrium in less than 7 percent of said cycle duration to bring the beds toward pressure equilibrium;

substantially ½ percent to 4 percent of the cycle duration after commencement of the equalizing step, before the pressure equalizing gas flow commences being evacuated from the evacuated bed, and while continuing the pressure equalizing gas flow between the beds, reversing the supply of gaseous mixture to and the evacuation of the beds; and, subsequent to reversing the beds, terminating the pressure equalizing gas flow and collecting the nonadsorbable component.

2. The method as set forth in claim 1 wherein the duration between reversing the beds and terminating the pressure equalizing gas flow is substantially 1 percent to 3 percent of the duration of the cycle.

3. The method as set forth in claim 2 wherein the nonadsorbable component is oxygen.

4. The method as set forth in claim 3 wherein said physical separation medium is type 5A zeolite.

5. The method as set forth in claim 3 wherein said physical separation medium is type 13× zeolite.

6. The method as set forth in claim 3 further including collecting the molecules of oxygen from the first and second beds in a reservoir.

7. The method as set forth in claim 6 further including causing the molecules of oxygen to flow through an outlet line at a selectable pressure and rate.

8. The method as set forth in claim 7 further including the step of adding water vapor to the oxygen flowing through the outlet line, whereby moisture removed by the first and second beds is replaced.

9. The method as set forth in claim 8 further including discharging the oxygen and water vapor into a breathing apparatus for a patient suffering respiratory difficulties such that the oxygen concentration of air available to the patient for breathing has a superatmospheric oxygen concentration.

10. A method of physically separating oxygen molecules from a gaseous mixture including oxygen, nitrogen, and water vapor, the method comprising:

(a) supplying the mixture under pressure to a first bed of a physical separation medium which passes the oxygen molecules and adsorbs nitrogen and water vapor molecules and concurrently evacuating a second bed of said physical separation medium;

(b) before said nitrogen and water vapor molecules traverse said first bed and while continuing to supply the gaseous mixture to the first bed and to evacuate the second bed, causing the first and second beds to approach substantial pressure equilibrium by allowing gas enriched with oxygen molecules to flow from the first bed to the second bed;

(c) before the oxygen enriched gas is evacuated from the second bed and while the oxygen enriched gas flows to the second bed, discontinuing supplying the gaseous mixture under pressure to the first bed and commencing evacuating the first bed and, concurrently, discontinuing evacuating the second bed and commencing supplying the gaseous mixture under pressure to the second bed such that the oxygen molecules separated by the first bed remain in the system and are not discharged during evacuation of the second bed;

(d) subsequent to commencing evacuating the first bed and supplying the gaseous mixture to the second bed, prohibiting the flow of oyxgen enriched gas between the beds;

(e) before said nitrogen and water vapor molecules traverse said second bed and while continuing to supply the gaseous mixture to the second bed and to evacuate the first bed, causing the first and second beds to approach substantial pressure equilibrium by allowing gas enriched with oxygen molecules to flow from the second bed to the first bed;

(f) before the oxygen enriched gas is evacuated from the first bed and while the oxygen enriched gas flows to the first bed, discontinuing evacuating the first bed and commencing supplying the gaseous mixture under pressure to the first bed and, concurrently, discontinuing supplying the gaseous mixture under pressure to the second bed and commencing evacuating the second bed such that oxygen molecules separated by the second bed remain in the system and are not evacuated during evacuation of the first bed;

(g) subsequent to commencing evacuating the second bed and supplying the gaseous mixture to the first bed, prohibiting the flow of oxygen enriched gas between the beds; and, (h) cyclically repeating steps (b) through (g).

11. The method as set forth in claim 10 wherein the duration between commencing steps (b) and (c) is in the range of ½ percent to 4 percent of the duration of performing one cycle of steps (b) through (g) and wherein the duration between commencing steps (e) and (f) is in the range of ½ percent to 4 percent of the duration of performing one cycle of steps (b) through (g).

12. The method as set forth in claim 11 wherein the duration between commencing steps (c) and (d) is in the range of 1 percent to 3 percent of the duration of performing one cycle of steps (b) through (g) and wherein the duration between commencing steps (f) and (g) is in the range of 1 percent to 3 percent of the duration of performing one cycle of steps (b) through (g).

13. The method as set forth in claim 12 wherein the duration between commencing steps (b) and (c) is substantially ½ the duration between commencing steps (c) and (d) and the duration between commencing steps (e) and (f) is substantially ½ the duration between commencing steps (f) and (g).

14. The method as set forth in claim 12 wherein the duration between commencing steps (b) and (c) and the duration between commencing steps (e) and (f) are each substantially 1 percent of the duration of performing one cycle of steps (b) through (g).

15. The method as set forth in claim 10 wherein the duration for performing one cycle of steps (b) through (g) is substantially 60 seconds; the duration between commencing steps (b) and (c) is in the range of ½ to 1½ seconds; the duration between commencing steps (c) and (d) is in the range of 1 to 1½ seconds; the duration between commencing steps (e) and (f) is in the range of ½ to 1½ seconds; and the duration between commencing steps (f) and (g) is in the range of 1 to 1½ seconds.

16. The method as set forth in claim 10 wherein the duration between commencing steps (b) and (c) and the duration between commencing steps (e) and (f) are both substantially 1 percent of the duration of performing one cycle of steps (b) through (g) and wherein the duration between commencing steps (c) and (d) and the duration between commencing steps (f) and (g) are both substantially 2 percent of the duration of the performing one cycle of steps (b) through (g).

17. An apparatus for physically separating molecules of oxygen from a nitrogen, water vapor, and oxygen containing gaseous mixture, the apparatus comprising:
  (a) a first bed of a physical separation material which is traversed by oxygen molecules and which adsorbs at least nitrogen and water vapor molecules from the gaseous mixture, the first bed having an inlet and an outlet;
  (b) a second bed of said physical separation material, the second bed having an inlet and an outlet;
  (c) a cross-over valving means for selectively connecting the inlet and one of the first and second beds with a supply of the gaseous mixture under pressure and the inlet of the other bed with a vacuum source;
  (d) a timing and control means including a first valve control means for causing the cross-over valving means to connect the first bed inlet cyclically with the gaseous mixture supply and the vacuum source and the second bed inlet cyclically with the vacuum source and the gaseous mixture supply, such that the cross-over valving means is actuated twice during each cycle;
  (e) a flow path connecting the first bed outlet and second bed outlet, the flow path having a gas flow capacity such that the flow path is sufficient to being the first and second beds substantially into pressure equilibrium in less than 7 percent of the duration of the cycle;
  (f) a pressure equalization valve for selectively permitting and preventing gas flow through the flow path, the pressure equalization valve being operatively connected with the timing and control means, said timing and control means further including pressure equalization valve controlling means for causing the pressure equalization valve to commence permitting gas flow more than ½ and less than 2 percent of said cycle duration before the cross-over valving means is actuated and causing the pressure equalization valve to commence preventing gas flow more than ½ and less than 3 percent of said cycle duration after actuation of the cross-over valving means;
  (g) a surge tank operatively connected with the first bed outlet and second bed outlet by undirectional valving means to receiving oxygen molecules from the first and second beds; and,
  (h) humidifier means operatively connected with the surge tank for adding water vapor to the oxygen rich gas therein.

18. The apparatus as set forth in claim 17 wherein said flow path has a gas flow capacity which is sufficient to bring the first and second beds substantially into pressure equilibrium in less than 3 percent of said cycle duration and wherein the pressure equalization valve controlling means causes the pressure equalization valve to commence permitting gas flow substantially 1 percent of said cycle duration before actuation of the cross-over valving means and causes the pressure equalization valve to commence prohibiting gas flow substantially 2 percent of said cycle duration after cross-over valving means actuation.

* * * * *